June 30, 1953 J. CLARK 2,643,869
ACCELEROMETER
Filed Jan. 15, 1948 2 Sheets-Sheet 1

INVENTOR.
JAMES CLARK
BY
Louis A. Kline
HIS ATTORNEY

Patented June 30, 1953

2,643,869

UNITED STATES PATENT OFFICE 2,643,869

ACCELEROMETER

James Clark, Dayton, Ohio

Application January 15, 1948, Serial No. 2,384

25 Claims. (Cl. 264—1)

This invention relates to accelerometers and in particular to an accelerometer which has an acceleration pick-up element which is compact, rugged, and unaffected by temperature variations; has a high output; and translates the accelerations and/or decelerations of a moving part into variations in a magnetic circuit which can be utilized to cause the true magnitude of a uniform acceleration or the true magnitudes of a varying acceleration and its wave form to be manifested.

Mechanical accelerometers have been provided in the past, but these have, in general, been quite bulky and heavy, so that, unless the part whose movement is being studied is quite large, the weight of the accelerometer would prevent accurate measurements from being obtained.

It has also been proposed to use wire strain gages in connection with pick-up elements for accelerometers. When these are used, they are cemented or otherwise secured to upper and/or lower surfaces of a cantilever beam which is secured at one end to the part being observed and has a weight secured to its free end. Acceleration or deceleration of the part will cause deflection of the free end of the beam, tensioning the side of the beam to which one strain gage is secured and compressing the side of the beam to which the other strain gage is secured. The strain gages will be tensioned and compressed as are the sides of the beam to which they are attached, and their resistance will vary in a corresponding manner, which changes in resistance are proportional to the acceleration or deceleration. The wire strain gages are connected in a bridge circuit, and changes in their resistance unbalance the circuit and enable electronic means to control an oscillograph which records the magnitude of the changes and thereby the magnitude of the acceleration. While this type of accelerometer overcame many drawbacks of the mechanical types, it had drawbacks of its own which were the source of possible errors. It was found very difficult to maintain, over a period of time, a uniform bond between the several strain gages and the beam to which they were cemented. It was also found that changes in temperature affected the bonds. Variations in the bonds under both of these conditions introduced errors in the results obtained.

The novel accelerometer of this invention overcomes all the above drawbacks. It consists of a novel, compact pick-up element which is relatively light and extremely rugged, has a high output, gives uniform measurements, and is not appreciably affected by changes in temperature. An electrical circuit is controlled by the pick-up element and, when properly calibrated, will manifest the true value of the magnitude of the acceleration.

The novel pick-up element is simple in its construction and consists of a relatively small capsule containing an acceleration-responsive system and small coils. The acceleration-responsive system also forms an integral part of a magnetic circuit and is capable of varying the reluctance of the magnetic circuit in proportion to constant or varying acceleration of the part being tested. The coils in the capsule may be used as elements of an alternating current bridge or as primaries and secondaries of transformers and are so arranged that changes in the reluctance of the magnetic circuit will cause corresponding changes in their inductance when they form elements of a bridge and will cause corresponding changes in their transformer action when they are used as elements of transformers.

The electrical circuit portion of the accelerometer includes the coils in the pick-up element.

When the coils are connected as either two or four arms of an alternating current bridge, changes in the inductance of the coils, caused by changes in reluctance of the magnetic circuits induced by acceleration, will unbalance the bridge in proportion to the acceleration, which unbalance in the bridge is used to control an oscillograph or other suitable previously calibrated apparatus to record or indicate the true magnitude of the acceleration.

When the coils are connected as primaries and secondaries of transformers, changes in the reluctance of the magnetic circuit induced by acceleration will change the flux density of the transformer core and will change the induced voltages in the secondaries in proportion to the valve of the acceleration.

The novel pick-up element is light and small and can readily be secured to the part being tested. With this type of pick-up element, variations in the bond between the pick-up element and the part will not affect the accuracy of the device because the strength of the bond itself does not enter into the measurement of the acceleration, as was the case when wire strain gages were used.

Extremely high output from the pick-up element is obtained by having the maximum area of flux path possible for the size and shape of the pick-up element. High output is also obtained when the coils are used as primaries and secondaries of transformers by proper selection of the characteristics of the primary and secondary coils and, if desired, by providing circuit elements to cause the circuits to be resonant at the frequency of the input voltage which is to be applied to operate the electrical components of the accelerometer.

Due to the inclusion of the acceleration-responsive system and the coils within the pick-up element, and to the use of proper materials, the effect of temperature changes on the element can be reduced to a point where they will have very little, if any, effect on the measurements being made. This is particularly true if the coils in the element are so connected that they form all four legs of the bridge or form the primaries and secondaries of transformers and are all affected in like manner by the temperature.

It is an object of this invention to provide a compact, light accelerometer which will give uniform results over a long period of time and which will not be appreciably affected by temperature changes.

Another object of this invention is to provide a novel acceleration pick-up element which has a high output, is light and compact, and is not appreciably affected by changes in temperature.

A further object of the invention is to provide a pick-up element in the form of a small capsule or shell which contains an acceleration-responsive system therein, the capsule and portions of the acceleration-responsive system forming magnetic circuits in which the reluctance varies with acceleration.

A further object of this invention is to provide a small, compact acceleration pick-up element in which accelerations are converted into changes in reluctance of a magnetic circuit which in turn causes changes in the magnitude of the induced voltages in the secondary coil of a transformer carried therein.

A further object of this invention is to provide a small, compact acceleration pick-up element containing a pair of magnetically-coupled transformers, in which accelerations are converted into changes in reluctance of magnetic circuits, which in turn cause changes in the output of the pair of transformers in proportion to the acceleration.

A further object of this invention is to provide a small, compact, self-contained acceleration pick-up element in which accelerations are converted into changes in reluctance of magnetic circuits, which in turn cause changes in the inductance of coils carried by the element.

A further object of this invention is to provide an accelerometer which includes an alternating-current bridge, two or more legs of which are inductances which vary with acceleration.

With these and incidental objects in view, the invention includes certain novel features of construction and combinations of parts, preferred forms or embodiments of which are hereinafter described with reference to the drawings which accompany and form a part of this specification.

In said drawings.

*General Description*

The novel accelerometer, which utilizes a small, compact pick-up element, has many advantages over other accelerometers.

The pick-up element, with its magnetic circuits and its enclosed acceleration-responsive system and coils, can be made very small and light; for example, a pick-up element which is approximately one and a half inches in diameter and one-half inch thick weighs approximately four ounces, and a pick-up element which is approximately one-half of an inch in diameter and one-quarter of an inch in thickness will weigh less than an ounce. The accelerometers using these small, compact pick-up elements are very useful for measuring accelerations and vibrations in high-speed aircraft and in measuring accelerations in relatively light members where heavier pick-up elements would modify the effect of the acceleration on the member.

Due to the nature of the acceleration-responsive system and its inclusion within the pick-up element, the pick-up element can be arranged so that it can measure very great accelerations, up to hundreds of times "G."

The novel pick-up element can be secured to the part to be checked by any convenient means which will hold it in place during its operation. Its operation is not affected, however, by the degree of the bond; all that is necessary is that the pick-up element follow exactly the movement of the part. This gives the novel accelerometer decided advantages over older types, in which the bond was a critical factor in their operation.

A further advantage of the novel pick-up element resides in its construction utilizing a pair of shell-like members in the magnetic circuits which enclose the air gaps that are varied with acceleration and also enclose the electrical means carried by the pick-up element. These shell-like elements act as a magnetic shield and prevent outside magnetic fields from materially affecting the operation of the accelerometer.

The novel pick-up element has the further advantage that it will have large output variations for accelerations in the range for which it is intended to operate.

The pick-up element, due to its novel arrangement, and when made of materials not affected by heat, will not be materially affected by changes in temperature.

The coils in the pick-up element are connected into associated electrical circuits and enable the acceleration-induced changes in reluctance in the magnetic circuits to be made apparent on an indicating or recording instrument. The readings of the instrument, when compared with a calibration curve prepared with known accelerations, enable the magnitude of the accelerations to be determined.

The accelerometer of the novel invention may vary in details of the pick-up element and associated circuits without departing from the invention, as will be apparent from the following description.

One embodiment of the novel accelerometer is disclosed in Figs. 1, 2, 3, 4, and 5. As shown particularly in Figs. 1 and 2, the pick-up element is in the form of a capsule made up of two shell-like elements, 22 and 24, which are made of magnetic material, are formed with annular chambers as 21 and 23 for receiving coil spools, and are formed with central, inwardly-disposed pole pieces 32 and 34.

Figure 2:
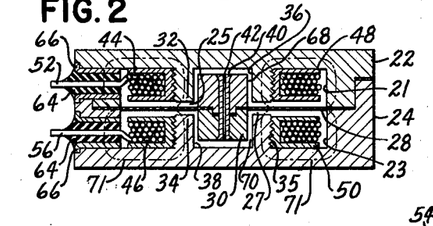
Fig. 2 is a section taken along the line 2—2 of Fig. 1.
Figure 3:
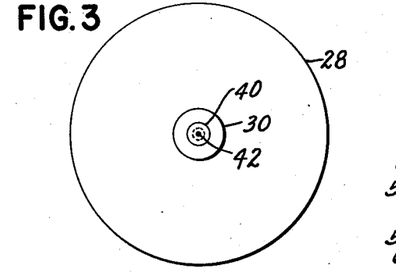
Figs. 3 and 4 show plan views of acceleration-responsive systems which may be used in the pick-up element.
Figure 4:
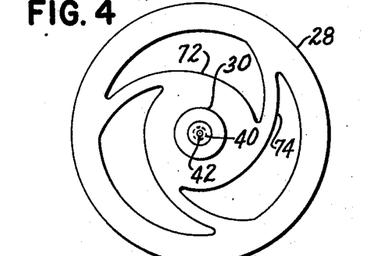

Supported between the elements 22 and 24 adjacent their outer edges and wholly within the capsule is an acceleration-responsive system, Figs. 2, 3, and 4, consisting of a disk-like spring member 28 of magnetic material and a free weight 30 secured to the central portion of the spring member 28 by any suitable means, as, for example, a rivet 40, which may be hollow, the pole pieces 32 and 34 being recessed at 36 and 38, respectively, to receive the weight 30. For the most effective operation of the accelerometer, it is necessary to obtain the best possible magnetic contact between the spring member 28 and the shell-like elements 22 and 24 around their entire periphery, which elements can be secured together by any suitable means.

The shell-like elements 22 and 24, together with the portion of the spring member 28 between the elements 22 and 24 and the pole pieces 32 and 34, form two magnetic circuits containing air gaps 25 and 27, the flux paths in the circuits being indicated by the dot-and-dash lines 71. The weight 30 and the rivet 40 may be made of magnetic or non-magnetic material as required by the particular conditions to be encountered in the use of the accelerometer.

It is to be noted that the spring member 28 not only supports the inertia member, or free weight 30, but also forms an integral part of the two magnetic circuits, whose reluctance is varied according to accelerations.

In the quiescent condition of the pick-up element, the air gaps on both sides of the spring member 28 will be substantially equal; but, when the pick-up element is moved up or down (Fig. 2) in response to an acceleration, the weight 30, due to its inertia, will lag behind the movement of the pick-up element and will flex the spring member 28. This will cause the air gap on one side of the spring member to be reduced and at the same time will cause the air gap on the other side of the spring member to be increased a corresponding amount.

Due to the short length of the magnetic circuit and to the large area of flux path obtained by use of the entire periphery of the capsule as a return path, the air gaps constitute a major element in determining the reluctance of the magnetic circuits. Variations in the air gaps produced by accelerations, therefore, cause pronounced changes in the reluctance of the magnetic circuits, increasing the reluctance of one circuit and at the same time reducing the reluctance of the other circuit substantially the same amount, the magnetic circuits being operated below saturation.

The acceleration-responsive system, therefore, is capable of converting uniform or variable (vibrations) accelerations or decelerations into changes in the reluctance of magnetic circuits.

Since the pick-up element may be used to measure variable accelerations, or vibrations, which occur at certain frequencies, it is necessary that the natural resonant frequency of the acceleration-responsive system including the spring member 28, the weight 30, and the rivet 40 be much greater than the maximum frequency to be encountered in the vibrations being measured. The resonant frequency of the acceleration-responsive system can be expressed by the equation $$f = \frac{1}{2\pi}\sqrt{\frac{k}{m}}$$

where $f$ = resonant frequency of the acceleration-responsive system in cycles per second;

$k$ = spring rate of spring member 28 in pounds per inch deflection;

and $m$ = mass of weight 30 in poundals.

From the above equation it is readily seen that the frequency of the system may be changed (1) by varying the magnitude of the weight by changing either the size of the weight or the material or density of the weight; or (2) by varying the spring rate of the spring member 28 as by using different materials and/or changing the diameter of the spring member, and/or changing the thickness if the spring member, and/or using various types of cut-out portions in the spring member, as shown in Fig. 4. In this figure, the hub 72 has the same outer diameter as the pole pieces 32 and 34, and the cut-out portions in the spring member form spokes 74. Variations in the spring rate of this type of spring member can be obtained by changing the radius of curvature and the width of the spokes as well as by changing the other properties as indicated above. For systems requiring a high resonant frequency, however, the solid form of spring member 28, as shown in Fig. 3, is generally used.

The damping characteristics of the acceleration-responsive system may be varied by filling the space inside of the capsule with a viscous fluid and by varying the size of the hole 42 in the rivet and the clearances 68 and 70 between the weight 30 and the sides of the recesses 36 and 38 in the pole pieces 32 and 34.

It should be noted that in the novel pick-up element the acceleration-responsive system including the spring member 28 and the free weight 30 is entirely within the capsule, which enables a small, compact, rugged pick-up element to be obtained. It should also be noted that, since the magnetic circuits operate below saturation and include the encompassing shell-like portions 22 and 24 and the central air gaps 25 and 27, which are varied to change the reluctance of the magnetic circuits according to accelerations, magnetic fields external to the pick-up element will have very little effect on the response of the pick-up element and will not prevent its operation.

In order to make the acceleration-induced changes in the reluctance of the magnetic circuits apparent and to enable the magnitude of the acceleration to be obtained, the pick-up element contains a pair of coils 44 and 46 (Figs. 1 and 2), which are wound on coil spools 48 and 50 and surround the pole pieces 32 and 34, respectively. The spools 48 and 50 are located in the annular chambers 21 and 23, respectively, and may be secured in place relative to the pole pieces by any suitable means, one means, for example, being shown in Fig. 2, in which the pole pieces and the spools are threaded, as at 35, and the spools are screwed in place on the pole pieces.

Figure 1:
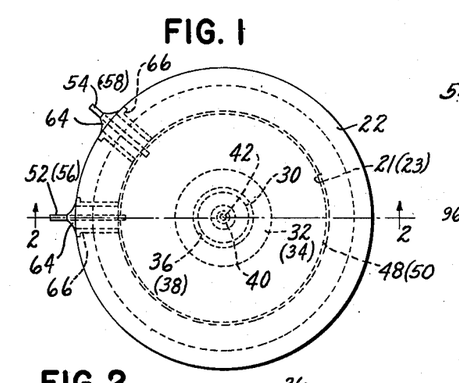
Fig. 1 is a plan view of an embodiment of the pick-up element which has but one coil associated with each magnetic circuit.

The ends of the coil 44 are connected to spaced terminals 52 and 54 carried by the shell-like member 22. The terminals are mounted in the member 22 in insulating fittings consisting of bushings 66 and electrical insulating material 64 and extend from cavity 21 through the fittings to provide a sufficient terminal outside the member 22 to enable electrical connections to be readily made thereto.

In a similar manner, the ends of the coil 46 are connected to spaced terminals 56 and 58, which are mounted in the shell member 24 in fittings also consisting of bushings 66 and electrical insulating material 64. Corresponding ends of the coils are connected to terminals 52 and 56, and their other ends are connected to terminals 54 and 58.

It is well known that in an alternating current circuit the inductance of a coil will vary with the reluctance of its associated magnetic circuit, so, by connecting the coils 44 and 46 in an alternating-current circuit, the inductive reactance of one coil, which varies directly with inductance, will be increased when its related air gap is decreased, and at the same time the inductive reactance of the other coil, which also varies directly with inductance, will be decreased when its related air gap is correspondingly increased. The fact that the inductance of one coil increases and the inductance of the other coil correspondingly decreases magnifies the effect of the response of the acceleration-responsive system.

Figure 5:
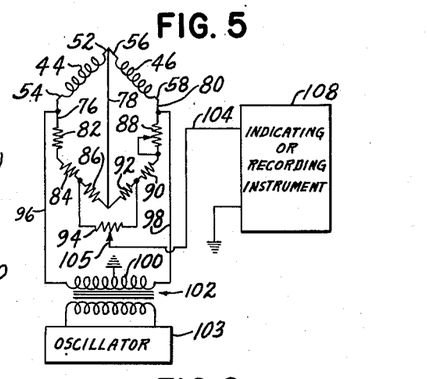
Fig. 5 shows, in simplified form, a typical circuit in which the coils in the pick-up element can be connected as two arms of an alternating-current bridge to provide an indication or record of the magnitude of accelerations.

Fig. 5 shows, in simplified form, a typical circuit in which the coils 44 and 46 are connected as two arms of an alternating-current bridge. The coils 44 and 46 are connected through their terminals 52, 54, 56, and 58 and connections as 76, 78, and 80 to resistors 82, 84, 86, 88, 90 and 92 forming the other two arms of the bridge, resistor 88 being adjustable to enable the bridge to be balanced.

The alternating-current input to the bridge is supplied over conductors 96 and 98, which connect to the bridge at conductors 76 and 80, respectively, and which extend from the secondary 100 of a transformer 102, which has alternating current impressed thereon by an oscillator shown schematically at 103 or by any other suitable means. The frequency of the alternating current applied to the bridge may be of any desired value up to many thousands of cycles per second as required by the conditions under which the pick-up element is to operate. Excellent results have been obtained with the use of frequencies up to fifty thousand cycles per second.

The output of the bridge, in the form of a voltage change, is taken off by means of a conductor 104 connected to a tapping member 105, which cooperates with resistor 94 connected to one arm of the bridge between resistors 84 and 86 and to the other arm of the bridge between resistors 90 and 92. The output on conductor 104 will vary with acceleration and can be used to control any suitable indicating or recording instrument, such as an electronic voltmeter or recording oscillograph, shown generally at 108 in Fig. 5, to indicate or record the true magnitude of the acceleration. If the indicating or recording instrument to be used requires it, the output on conductor 104 may be amplified by any suitable and well-known type of amplifying means before being applied to the indicating or recording instrument.

It is to be understood that the invention is not limited to the use of the particular form of resistance network forming the other two arms of the bridge, as shown in Fig. 5, because the other two arms of the bridge may also consist of inductances external to the pick-up element, nor is it limited to the particular output take-off shown in this figure, because the forms shown are merely illustrative and variations therein may be made without departing from the invention.

The operation of this embodiment of the accelerometer is as follows:

After the coils 44 and 46 in the pick-up element have been connected to the resistance arms of the bridge and alternating current is supplied to the bridge, and while the pick-up element is quiescent, the bridge is balanced by adjusting the resistor 88, and the desired "zero" or base point on the indicating or recording instrument is obtained by adjusting the tapping member 105 relatively to the resistor 94. Any acceleration of the pick-up element will, due to the lag in movement of the free weight 30, cause the spring member 28 to flex, reducing one of the air gaps 25 or 27 in proportion to the acceleration and correspondingly increasing the other air gap. These variations in the air gaps will vary the reluctance of the magnetic circuits in which they are included and will change the inductance and thereby the inductive reactance of the coils 44 and 46 to unbalance the bridge and produce a potential variation on conductor 104, which potential variation can be utilized to cause an operation of the indicating or recording apparatus. The readings of the indicating or recording apparatus, when compared with a calibration curve prepared with known accelerations, enable the true magnitudes of accelerations being applied to the pick-up element to be ascertained.

Another embodiment of the novel accelerometer is shown in Figs. 6, 7, 8, 9, and 10.

The pick-up element of this embodiment contains circuits which are constituted and operate substantially the same as those in the embodiment shown in Figs. 1, 2, 3, and 4. It includes the two shell-like elements 22 and 24, which are made of magnetic material, are formed with coil-receiving chambers 21 and 23, and are also formed with central, inwardly-disposed, recessed pole pieces 32 and 34.

It also includes an acceleration-responsive system consisting of a disk-like spring member 28, which has the free weight 30 secured thereto by a hollow rivet 40. As in the other embodiment, the spring member 28 is clamped between the elements 22 and 24 at the periphery of the member 28 and cooperates with the elements 22 and 24 to form two magnetic circuits which include air gaps 25 and 27 on either side of the spring member, between the spring member and the central inwardly-disposed pole pieces 32 and 34, respectively.

As in the other embodiment, in the quiescent condition of the pick-up element, the air gaps on both sides of the spring member 28 will be substantially equal, but, when the pick-up element is moved up or down (Fig. 7) in response to an acceleration, the weight 30, due to its inertia, will lag behind the movement of the pick-up element and will flex the spring member 28 to increase one air gap and reduce the other air gap, causing appropriate changes in the reluctance of the magnetic circuits. In this pick-up element, the spring member 28 not only supports the inertia member, or free weight 30, but also forms an integral part of the two magnetic circuits, whose reluctance is varied according to accelerations.

Figure 6:
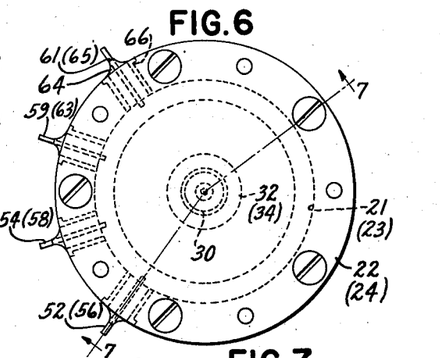
Fig. 6 is a plan view of another embodiment of the pick-up element which has a pair of coils associated with each magnetic circuit.
Figure 7:
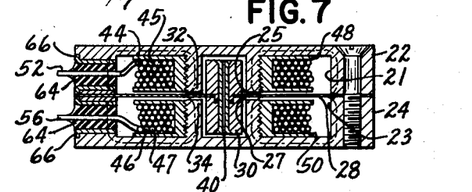
Fig. 7 is a section taken along the line 7—7 of Fig. 6.

The advantages of the form of acceleration-responsive system, the variations which may be made therein to control its resonant frequency, and its damping characteristics, as given in connection with the embodiment shown in Figs. 1 to 4 inclusive, apply equally to the pick-up element shown in Figs. 6 and 7.

The principal difference between the pick-up element shown in Figs. 1 and 2 and the one shown in Figs. 6 and 7 is in the coils which are provided to enable the acceleration-induced changes in the reluctance of the magnetic circuits to be made apparent and the magnitude of the accelerations to be obtained.

Instead of having a single coil wound about each of the coil spools 48 and 50, the embodiment of the pick-up element shown in Figs. 6 and 7 has two coils, 44 and 45, wound together on spool 48 and two coils 46 and 47 wound together on the coil spool 50. The coils need not be wound together, as shown in Fig. 7, but may be wound separately on the coil spool in side-by-side relation or one outside of the other if desired.

Four terminals, 52, 54, 59, and 61, are mounted in the shell-like element 22 in insulating fittings consisting of sleeve portions and insulating material similar to those described above in connection with the pick-up element of Figs. 1 and 2. The ends of the coils 44 and 45 are connected to these terminals. In a similar manner, the ends of the coils 46 and 47 are connected to terminals 56, 58, 63, and 65 mounted in insulating fittings in the shell-like element 24.

The pick-up element of Figs. 6 and 7 is utilized in much the same manner as that of Figs. 1 and 2—i. e., in an alternating-current bridge arrangement—but is much more versatile because the two coils on one coil spool, which form one arm of the bridge, can be connected either in series or in parallel, as required by the conditions to be encountered in the use of the accelerometer.

Figure 8:
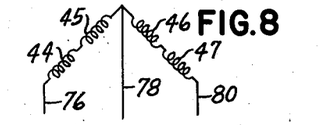
Fig. 8 shows how the pair of coils for each magnetic circuit can be connected in series to operate as an arm of the bridge circuit of Fig. 5.

Fig. 8 shows how the coils 44 and 45 on spool 48 can be connected in series to form one arm of the bridge and how coils 46 and 47 can be connected in series to form another arm of the bridge. These two arms, when connected by means of conductors 76, 78, and 80 to the rest of the bridge circuit shown in Fig. 5, operate just as do the two arms 44 and 46, shown therein.

Figure 9:
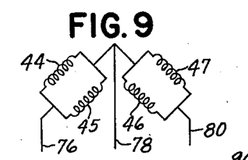
Fig. 9 shows how the pair of coils for each magnetic circuit can be connected in parallel to operate as an arm of the bridge circuit of Fig. 5.

Fig. 9 shows how the coils 44 and 45 can be connected in parallel to form one arm of the bridge and coils 46 and 47 can be likewise connected in parallel to form another arm of the bridge. These two arms can be connected over the conductors 76, 78, and 80 to the rest of the bridge circuit, as shown in Fig. 5, to operate effectively as two arms of an alternating-current bridge.

When using the coils, either series-connected, as in Fig. 8, or parallel-connected, as in Fig. 9, in the circuit of Fig. 5, acceleration-induced changes in the reluctance of the magnetic circuits cause related changes in the inductive reactance of the coils and unbalance the bridge. Such unbalancing of the bridge produces potential changes on the output conductor 104 which, as explained earlier herein, can be used to control any suitable indicating or recording instrument 108 in a manner similar to that explained earlier herein.

Figure 10:
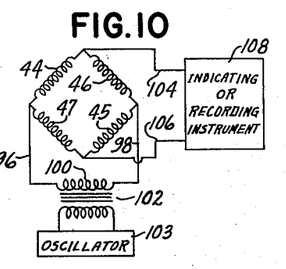
Fig. 10 shows, in simplified form, a typical circuit in which all four coils carried by the pick-up element operate as arms of an alternating-current bridge circuit to enable the acceleration-induced changes in reluctance of the magnetic circuits to be made apparent and the magnitude of the acceleration to be obtained.

The versatility of the form of pick-up element shown in Figs. 6 and 7 is further demonstrated in Fig. 10, wherein the four coils 44, 45, 46, and 47 of the pick-up element are shown connected to form all four arms of an alternating-current bridge. The accelerometer in which the four coils in the pick-up element are used as separate arms of the bridge has several pronounced advantages. First, it eliminates the need of external circuit elements to form any of the arms of the bridge. Second, it simplifies the operation of the accelerometer because, if the coils in the pick-up element are balanced properly when the pick-up element is made and always cooperate in the same manner in the bridge, there will be very little, if any, balancing of the bridge required each time the accelerometer is used. Third, it minimizes the effect of temperature changes because all four arms of the bridge are contained in the same pick-up element, so that they will be affected to substantially the same degree by changes in temperature, and the operation of the bridge as a whole will not materially be affected. Fourth, it amplifies the acceleration-produced effect because the inductances and consequently the inductive reactance of all four arms of the bridge are varied in response to accelerations, and, with the coils connected as shown in Fig. 10, larger variations in output voltage can be obtained for given accelerations than was the case when only two arms of the bridge were affected by accelerations.

In the circuit of Fig. 10, alternating current having the desired frequency is supplied to the bridge over conductors 96 and 98, which are connected to the bridge between coils 44 and 47 and between coils 46 and 45, respectively, and which extend from the secondary 100 of a transformer 102, that has alternating current impressed thereon by an oscillator, shown schematically at 103, or by any other suitable means.

The output of the bridge, in the form of a voltage change, is taken off by means of conductors 104 and 106, which are connected to the bridge between coils 44 and 46 and between coils 47 and 45, respectively, and which extend to the indicating or recording instrument, as 108, which indicates or records the magnitude of the acceleration. If required, the output from the bridge may be amplified by any suitable and well-known type of amplifying means before being applied to the indicating or recording instrument.

The operation of the accelerometer of Fig. 10 is as follows:

With the pick-up element quiescent and with alternating current applied to the bridge, the "zero" or base reading will be noted on the indicating or recording instrument. Any acceleration of the pick-up element will, due to the lag in movement of the free weight 30, cause the spring member 28 to flex, reducing one of the air gaps 25 or 27 in proportion to the acceleration and correspondingly increasing the other air gap. These variations in the air gaps will vary the reluctance of the magnetic circuits in which they are included and will change the inductance of the coils, the inductance of coils 44 and 45 related to the same magnetic circuit being varied in like manner and the inductance of coils 46 and 47 related to the same magnetic circuit being varied also in like manner.

Accordingly, with the coils on one spool included between different input and output conductors as shown, variations in their inductive reactances due to variations in their inductances will have a cumulative effect and will produce greater output potential changes on conductors 104 and 106 to cause the operation of the indicating or recording apparatus. The readings of the indicating or recording apparatus, when compared with a calibration curve prepared with known accelerations, enable the true magnitude of the accelerations being applied to the pick-up element to be ascertained.

A further embodiment of the invention, shown in Figs. 11 to 17, has many advantages over either of the earlier-described embodiments.

This embodiment is similar in many respects to the embodiment described earlier herein, using the same acceleration-responsive magnetic systems as shown in Figs. 1 to 4, 6, and 7 and using two coils on each coil spool, as shown in Figs. 6 and 7. However, this embodiment utilizes different types of coils and a different method of making the acceleration-induced changes in reluctance apparent.

Figure 11:
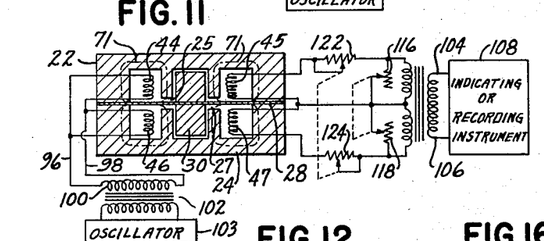
Figs. 11 and 12 show, schematically, variations of a further embodiment of the invention in which two coils associated with each magnetic circuit are connected to operate in an electrical circuit as primaries and secondaries of transformers whose outputs vary in response to accelerations.
Figures 12, 16, 17, 18, 19, 21:
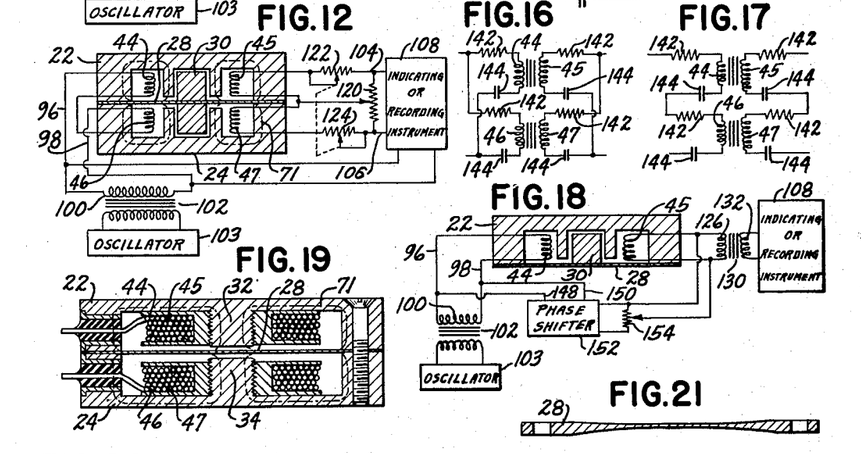
Figs. 14 through 17 show various arrangements of external resistance and capacitance which can be used in the circuits containing the primaries and secondaries of the pick-up-element-contained transformers to control their resonance thereof.
Fig. 18 shows schematically a further embodiment of the invention, utilizing but one magnetic circuit, the reluctance of which is varied with acceleration and varies the output of a transformer associated therewith.
Figs. 19, 20, 21, and 22 show a pick-up element in which the acceleration-responsive system utilizes the weight of the spring member as the free weight.

As shown schematically in Figs. 11 and 12, the coils 44 and 45 on the coil spool 48 and the coils 46 and 47 on coil spool 50 are connected so as to act as two magnetically-coupled transformers, each having a primary and secondary winding contained on a coil spool and each having a variable air gap in its magnetic circuit.

When the coils in the pick-up element are to be used as primaries and secondaries of transformers, the coils as 44 and 46, which serve as primaries, will be made of heavier wire and will have fewer turns than the secondary coils 45 and 47 in order to provide a greater transformation ratio and to enable greater output voltage changes to be obtained from the secondary coils in response to accelerations. By varying the size and number of turns of wire on the primary and secondary coils 44 and 46 and 45 and 47, respectively, the magnitude of the variation in output voltage per unit acceleration can be controlled to a great extent, and the reflected impedance of the primary and/or secondary can be varied to match the reflected impedance of external circuits with which they are to be used.

The alternating current applied to the primary coils 44 and 46 causes an alternating magnetic flux in the two magnetic circuits formed by the shell-like elements 22 and 24 and the spring member 28, which is common to and forms a part of both magnetic circuits. By controlling the phase in which the primary coils 44 and 46 are connected in the primary potential supply circuit, the magnetic flux may be made to add or subtract in spring member 28. For best results, the coils 44 and 46 should be so connected that they cause the flux to add in the spring member 28. The path of the flux in the two circuits is shown by the dot-and-dash line 71.

The alternating magnetic flux cuts the secondary coils 45 and 47 and induces voltages in these secondary coils. The voltage induced in the secondary coils will be proportional to the amount of flux in their related magnetic circuits, so that, when the reluctance of a magnetic circuit is varied and varies the amount of flux in the magnetic circuit, the induced output voltage of the secondary coil related to that magnetic circuit will vary correspondingly.

As explained earlier herein, when the pick-up element is moved in response to an acceleration, the free weight 30 will cause the spring member 28 to flex and reduce one of the air gaps 25 or 27 to reduce the reluctance of its magnetic circuit and at the same time increase the other air gap to increase the reluctance of its related magnetic circuit. The decrease in the reluctance of the one magnetic circuit allows a greater flux density to be produced therein and causes a greater voltage to be induced in the related secondary coil, and the increase in the reluctance of the other magnetic circuit which occurs at the same time will cause a smaller flux density to be produced in this circuit and cause a reduction in the voltage induced in its related secondary coil. If the secondary coils are properly phased, these variations in the induced voltages can be made to be cumulative and produce very pronounced variations in the output voltage of the accelerometer. The output variations produced when the coils operate as transformers are much greater than when the coils operate as arms of a bridge and have the further advantage that they are more nearly in a straight line relation with the accelerations which cause them.

The primary coils 44 and 46 may be connected in parallel to the source of potential applied over the leads 96 and 98, as shown in Fig. 11, or may be connected in series, as shown in Fig. 12. When the coils are connected in parallel, each coil will have a greater current therethrough for a given voltage applied thereto than when the coils are connected in series, but, when the coils are connected in parallel, the current in the two coils will not always be equal but will vary due to changes in their inductive reactance resulting from the changes in the reluctance of their magnetic circuits brought about by accelerations.

By connecting the secondary coils 45 and 47 in series, as shown in Figs. 11 and 12, and by properly phasing them, the induced voltage in one coil will be 180 degrees out of phase with the induced voltage in the other and, if properly balanced, should add vectorily to produce a zero resultant output voltage on leads 104 and 106 for zero acceleration. When an acceleration modifies the reluctance of the two magnetic circuits, it increases the induced voltage in one coil and decreases the induced voltage in the other coil, which voltages, when added vectorily, give a resultant output voltage across leads 104 and 106 which can be used to control an indicating or recording instrument, as at 108, to produce a manifestation of the magnitude of the acceleration. By connecting the input leads 96 and 98 to the indicating and recording instrument and comparing the phase of the resultant output voltage with that applied on the leads 96 and 98, as shown in Fig. 12, it can be determined whether the change in motion is an acceleration or a deceleration.

For normal operation, it is usually desirable for the output voltage of the accelerometer to be zero when there is no acceleration. Small differences in induced voltages in the unaccelerated pick-up element may be compensated by adjusting the mechanically-linked variable resistors 116 and 118 in Fig. 11 or adjusting the variable tapping member relatively to the resistor 120 in Fig. 12.

The response of the two output coils to changes in reluctance in their magnetic circuits can further be controlled by mechanically-coupled variable resistors as 122 and 124, shown in Figs. 11 and 12.

Figure 13:
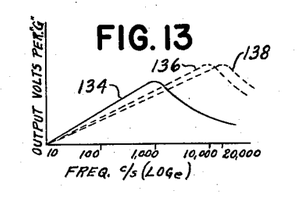
Figs. 13 shows typical output curves for different resonant circuits, showing how their output varies when operating potentials are applied thereto at different frequencies.

When the accelerometers are used, it has been found that they have a maximum response at some applied frequency due to the natural resonance of their circuits. Fig. 13 shows a typical response curve at 134, which curve shows a maximum response or output in volts per "G" when the applied operating potential has a frequency of about 1,000 cycles per second. For certain uses of the accelerometer, it is desirable to obtain the maximum response at lower or higher frequencies, as, for instance, illustrated by curves 136 and 138, showing the maximum response when the applied operating potential has frequencies of 10,000 and 20,000 cycles per second, respectively. In order to change the natural resonant frequency of the primary and/or the secondary circuits associated with the pick-up element, either or both may include external resistances and capacitances, as shown in Figs. 14 and 17 inclusive, which show various series and parallel circuit arrangements that may be used.

Figure 14:
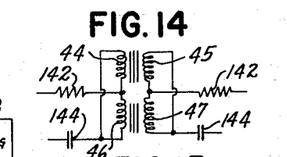

Fig. 14 shows the primary and secondary coils of the two transformers connected in parallel and a resistance 142 and capacitance 144 in series in each of the circuits. Variations in the values of resistance and capacitance used in each circuit can change the resonant frequency of the circuit as desired.

Figure 15:
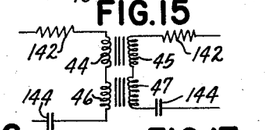

Fig. 15 shows the primary coils connected in a series circuit and the secondary coils in a series circuit with a resistance 142 and capacitance 144 in series with the coils in each circuit. Fig. 17 shows circuits similar to those of Fig. 15 but with a separate resistor 142 and capacitor 144 for each coil to enable the inductive reactance of each coil to be balanced with capacitative reactance to produce desired resonance in the circuit.

Fig. 16 shows the primary coils connected in parallel in a circuit and the secondary coils connected in parallel in a circuit and shows a separate resistor 142 and capacitor 144 for balancing the inductive reactance of each coil to control the resonance in the circuit.

The reflected impedance of the pick-up element may also be varied within certain limits to match the external circuits connected to its primaries and secondaries by varying the size and number of turns of wire used in these coils.

The operation of this embodiment of the accelerometer is as follows:

After the primary coils in the pick-up element have been connected to a suitable source of alternating current having the desired frequency and the secondary coils have been connected to an indicating or recording instrument, as 108, either through a transformer coupling, as shown in Fig. 11, or directly, as shown in Fig. 12, the input and/or output circuits can be adjusted to produce the desired output with the pick-up element quiescent.

When the pick-up element is moved in response to an acceleration, the spring member 28 is flexed, as explained earlier herein, increasing the reluctance of one magnetic circuit and at the same time reducing the reluctance of the other magnetic circuit. These changes in reluctance cause changes in the amount of flux in the magnetic circuits which can cut the secondary coils of the transformer and cause changes in the voltage induced in the secondary coils. The indicating or recording apparatus can be controlled by these changes in induced voltage to indicate or record the acceleration-produced changes, which indications or records, when compared with a calibration curve prepared with known accelerations, enable true magnitudes of accelerations being applied to the pick-up element to be ascertained.

Another embodiment of the invention which is similar to that shown in Figs. 11 and 12 is shown schematically in Fig. 18. In this embodiment, the pick-up element contains only one magnetic circuit, whose reluctance varies with acceleration, and this is formed by the shell-like element 22 and the acceleration-responsive system including the spring member 28 and the free weight 30 carried thereby. The pick-up element also contains a transformer whose primary coil 44 and secondary coil 45 are coupled by the magnetic circuit in such a manner that variations in the reluctance of the magnetic circuit in response to accelerations produce variations in the voltage induced in the secondary coil.

Alternating current of the desired frequency is applied to the primary coil 44 over conductors 96 and 98 from the secondary 100 of a transformer 102, whose primary is connected to an oscillator 103 or any suitable source of alternating current. Conductors 148 and 150 connect a phase shifter 152 to the input conductors 96 and 98. This phase shifter, which may be of any well-known form, shifts the phase of the input potential 180 degrees and applies it to oppose the induced voltages of the secondary coil 45. The potential divider 154 enables the voltage opposing the induced voltage to be adjusted to balance out the induced voltage when the pick-up element is quiescent, which balance is upset whenever an acceleration varies the induced voltage of the secondary coil 45.

This unbalance between the applied and induced voltage will be effective through the transformer 130, whose primary 126 is connected in the circuit with the secondary coil 45 of the pick-up element, and whose secondary coil 132 is connected to an indicating or recording apparatus, as 108, to cause the indicating or recording apparatus to indicate the extent of the unbalance. Readings of the indicating or recording apparatus 108, when compared with calibration curves, made with known accelerations, disclose the magnitudes of the accelerations. The response characteristics of this embodiment of the accelerometer may be controlled by controlling the natural resonance of its circuits in the same manner as explained for the embodiment shown in Figs. 11 to 17 inclusive.

When the accelerations to be measured are very large or when very high resonant frequency is required in the acceleration-responsive system, the free weight 30 can be eliminated and the stiffness and mass of the spring member 28 can be varied to meet the required conditions by varying the thickness of the member in its free unsupported area, as shown in Figs. 19, 20, 21, and 22.

Figure 20:
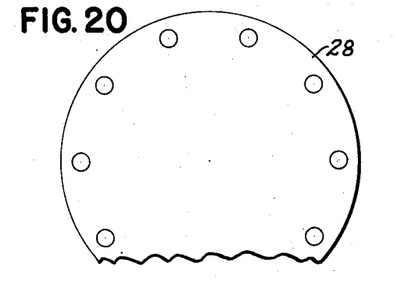
Figure 22:
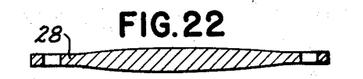

Fig. 19 shows a section of a pick-up element in which the free weight 30 has been omitted from the spring member 28 and the mass of the free, unsupported area of the spring member 28 serves as the free weight. Fig. 20 shows a plan view of the spring member 28. The thickness of the spring member 28 may be uniform, as shown in Fig. 19, or it may vary with the radius, as shown in Figs. 21 and 22.

These acceleration-responsive systems can be used with the above-described embodiments using two coils or four coils either as arms of a bridge or as primaries and secondaries of transformers.

In order to reduce variations in the output of any of the above embodiments due to temperature changes, the shell-like elements 22 and 24 and the spring member 28 can be made from magnetic materials having a low thermal coefficient of expansion, such as the well-known iron-nickel alloy known as "Invar"; however, where temperature effects are not serious, the elements 22 and 24 and the spring member 28 may be made of various other magnetic materials, such as magnetic steels or powdered iron, powdered iron being preferably used for the shell-like elements 22 and 24 when it is desired that the magnetic circuit have a high "Q" value and be operated with a very high frequency alternating current.

The effect of temperature changes on the output of the accelerometer can also be reduced when the coils are wound with a wire that has a low thermal coefficient of resistivity, such as the copper-nickel alloy "Copel," and when the damping fluid, if used, is one of the "Silicone" oils which have very little change in viscosity with changes in temperature.

The insulating bushings for the terminals in the pick-up element can be made relatively insensitive to temperature changes by making the sleeves 66 and the terminals of the alloy known as "Kovar" and using, for the insulation 64, a glass which has substantially the same coefficient of expansion as the "Kovar" to insulate the terminal, as 56, from the sleeve 66.

The novel accelerometer, therefore, is small and compact, has a self-contained acceleration-responsive system, and contains coils which can make acceleration-induced changes in reluctance in magnetic circuits apparent either by acting as arms of an alternating-current bridge or by acting as a transformer in which the induced voltage in the secondary varies with changes in reluctance.

While the forms of the invention shown and described herein are admirably adapted to fulfill the objects primarily stated, it is to be understood that it is not intended to confine the invention to the forms disclosed herein, for the novel accelerometer is susceptible of embodiment in various other forms all coming within the purview of the invention.

What is claimed is:

1. An accelerometer containing a pair of magnetic circuits including a rigid member of magnetic material for each circuit and a spring member of magnetic material common to and forming an integral part of the two circuits, each of said rigid members having thereon a pole piece, and said spring member being located between the two rigid members and engaging them at corresponding parts of the two circuits and being separated from the pole pieces to form air gaps therewith, one on each side of the spring member, said spring member flexing in response to accelerations to simultaneously increase one air gap and decrease the other air gap, thereby varying the reluctance of the magnetic circuits according to accelerations; two transformers, one for each magnetic circuit, each transformer mounted on the pole piece of its related magnetic circuit, which pole piece serves as a core therefor and magnetically couples the primary and the secondary of the transformer so that voltages induced in the secondary coil will vary when the reluctance of the magnetic circuit varies in response to accelerations; means supplying alternating-current operating potential to the primaries of both transformers; means connecting the secondaries in an output circuit whose output varies with variations in induced voltages in the secondary coils; and means controlled by the output circuit for manifesting the variations therein, the manifestations, when compared with a calibration chart made with known accelerations, giving the magnitude of the accelerations.

2. An accelerometer including two magnetic circuits containing a rigid member of magnetic material for each circuit and a spring member of magnetic material common to and forming an integral part of both circuits, said spring member being located between the two rigid members and engaging them at corresponding parts of the two circuits and being separated from the members at other corresponding parts of the circuits to form air gaps, one on each side of the spring member, the spring flexing in response to accelerations to simultaneously increase one air gap and decrease the other air gap, thereby varying the reluctance of the magnetic circuits according to accelerations; two step-up transformers, one for each magnetic circuit, each transformer mounted on the rigid member of its related magnetic circuit as a core, which so couples the primary and secondary coils that voltage induced in the secondary coil will vary when the reluctance of the magnetic circuit varies in response to accelerations; means including a circuit for supplying alternating-current operating potential of a desired frequency to the primaries of both transformers; means connecting the secondary coils of both transformers in an output circuit whose output varies with variations in induced voltages in the secondary coils; means controlled by the output circuit for indicating or recording the variations in the output of the output circuit; and impedances induced in the input and output circuits to control the natural resonance of the circuits so that they will be resonant at said desired frequency, whereby greater output variations may be obtained for given accelerations.

3. In an accelerometer, the combination of a magnetic circuit including a spring member of magnetic material and a rigid member of magnetic material, the spring member engaging the rigid member at one point in the circuit and being separated from the rigid member at another point in the circuit to form an air gap, and the spring member having inertia and flexing in response to accelerations to vary the air gap and thereby vary the reluctance of the magnetic circuits according to accelerations; a transformer having its primary coil and secondary coils mounted on the rigid member which magnetically couples the coils so that the voltage induced in the secondary coil of the transformer will vary with the variations in reluctance of the magnetic circuit due to acceleration; input means to supply operating alternating-current potential to the primary coil of the transformer; a circuit including a phase shifter and a voltage regulator connecting the input means potential across the secondary coil of the transformer to control the phase and value of the potential applied to the secondary coil to balance out the voltage induced in the secondary coil when the accelerometer is quiescent; and means coupled to the secondary coil to indicate unbalance between the induced and applied voltage due to changes in induced voltage brought about by accelerations.

4. A thermally stable pick-up element of an accelerometer, containing a pair of magnetic circuits including a rigid member of magnetic material for each circuit and a spring member of magnetic material common to and forming an integral part of the two circuits, said spring member being located between the two rigid members and engaging them at corresponding parts of the two circuits and being separated from the members at other corresponding parts of the circuits to form air gaps on each side of the spring member, said two rigid members and said spring member being made of material having a low thermal coefficient of expansion to maintain the dimensions of the members and the air gaps constant throughout changes in temperature, and said spring member flexing in response to accelerations to simultaneously increase the length of one air gap and decrease the length of the other air gap, thereby varying the reluctance of the magnetic circuits according to accelerations; electrical coils mounted on the rigid members of the magnetic circuits and having their operating characteristics varied by variations in the reluctance of the particular magnetic circuit containing the rigid member on which it is mounted, each coil being wound from material having a low thermal coefficient of resistivity to minimize the effect of temperature variations on the operating characteristics resulting from the acceleration-produced changes in reluctance of its related magnetic circuit.

5. A pick-up element for an accelerometer, containing a magnetic circuit including a spring member of magnetic material and a rigid member of magnetic material, the spring member engaging the rigid member at one point in the circuit and being separated from the rigid member at another point in the circuit to form an air gap, the spring member having inertia and flexing in response to accelerations which are applied to the pick-up element to vary the length of the air gap and thereby vary the reluctance of the magnetic circuit according to said accelerations; and containing a transformer whose primary and secondary coils are mounted on the rigid member as a core which couples the primary and the secondary magnetically so that variation in the reluctance of the magnetic circuit in accordance with accelerations causes variations in the coupling and thereby variations in the voltage which will be induced in the secondary coil.

6. A pick-up element for an accelerometer, containing a magnetic circuit including a spring member of magnetic material and a rigid member of magnetic material, the spring member engaging the rigid member at one point in the circuit and being separated from the rigid member at another point in the circuit to form an air gap, the spring member being weighted and flexing in response to accelerations to vary the air gap and thereby vary the reluctance of the magnetic circuit according to accelerations; and containing electrical means whose operating characteristics are varied by the variations in the reluctance of the magnetic circuit.

7. A pick-up element for an accelerometer, containing two magnetic circuits including a rigid member of magnetic material for each circuit and an inertia member of magnetic spring material common to and forming an integral part of the two circuits, said inertia member being located between the two rigid members and engaging them at corresponding parts of the two circuits and being separated from the members at other corresponding parts of the circuits to form air gaps, one on each side of the inertia member, the inertia member flexing in response to accelerations to simultaneously increase one air gap and decrease the other air gap, thereby varying the reluctance of the circuits in response to accelerations and containing two transformers, one for each magnetic circuit, the primary and secondary coils of each transformer being mounted on the rigid member of its related magnetic circuit as a core and coupled by the magnetic circuit which varies the voltage which will be induced in the secondary coil when the reluctance of the magnetic circuit is varied in response to accelerations.

8. An accelerometer containing two magnetic circuits including a rigid member of magnetic material for each circuit and a spring member of magnetic material common to and forming an integral part of the two circuits, said spring member being located between the two rigid members and engaging them at corresponding parts of the two circuits and being separated from the members at other corresponding parts of the circuits to form air gaps, one on each side of the spring member, the spring member being the inertia member of the accelerometer which lags behind the movement of the rigid members, when the accelerometer is subject to accelerations, and flexes to simultaneously increase the length of one air gap and decrease the length of the other air gap to vary the reluctance of the magnetic circuits inversely in response to accelerations; two transformers, one for each magnetic circuit, the primary and secondary coils of each of the transformers being mounted on the rigid member of its related magnetic circuit as a core and so coupled by its related magnetic circuit that the voltages induced in the secondaries will vary when the reluctances of the magnetic circuits vary; means connecting the primary coils of both transformers to a source of alternating-current operating potential; means connecting the secondary coils in series with their induced voltages in opposition and including adjustable means to enable the induced voltages to be balanced out when the accelerometer is quiescent, which balance is upset when acceleration varies the induced voltage in each secondary coil; and means connected to the means connecting the secondary coils and controlled thereby to indicate the unbalance between the induced voltages of the secondary coils of the two transformers in response to an acceleration and thereby indicate the magnitude of the acceleration.

9. A pick-up element for an accelerometer, containing a pair of magnetic circuits including a rigid member of magnetic material for each circuit and an inertia member of springy magnetic material common to and forming an integral part of the two circuits, said inertia member being located between the two rigid members and engaging them at corresponding parts of the two circuits and being separated from the members at other corresponding parts of the circuits to form air gaps one on each side of the inertia member, the inertia member flexing in response to accelerations to simultaneously increase one air gap and decrease the other air gap thereby varying the reluctance of the magnetic circuits according to acceleration; and containing, for each magnetic circuit, electrical means mounted on the rigid members of the magnetic circuits which control the operating characteristics of the electrical means to produce different electrical outputs according to the variations in the reluctance of their related magnetic circuits.

10. In an accelerometer, the combination of a pair of magnetic circuits including a rigid member of magnetic material for each circuit and a spring member of magnetic material common to and forming an integral part of the two circuits, said spring member being located between the two rigid members and engaging them at corresponding parts of the two circuits and being separated from the members at other corresponding parts of the circuits to form air gaps one on each side of the spring member, the spring member flexing in response to accelerations to simultaneously increase one air gap and decrease the other air gap, thereby varying the reluctance of the magnetic circuits according to accelerations; a pair of transformers, one for each magnetic circuit, the primary and secondary coils of a transformer being coupled by the related magnetic circuit so that the voltage induced in the secondary coil will vary with variations in the reluctance of the magnetic circuit to produce different potential outputs for different accelerations; means to apply operating alternating potential to the primary coils of both transformers; an output circuit including the secondary coils of both transformers; and means controlled by the output circuit to manifest the acceleration-induced variations in the induced voltages of the transformers, whereby the magnitude of the accelerations can be ascertained.

11. A pick-up element for an accelerometer, containing a pair of magnetic circuits including a rigid member of magnetic material for each circuit and an inertia member of springy magnetic material common to and forming an integral part of the two circuits, said inertia member being located between the two rigid members and engaging them at corresponding parts of the two circuits and being separated from the members at other corresponding parts of the circuits to form air gaps one on each side of the inertia member, the portion of the inertia member which cooperates with the rigid members to form air gaps, lagging behind the movement of the rigid members when the pick-up element is moved in response to accelerations and simultaneously increasing one air gap and decreasing the other air gap, thereby varying the reluctance of the magnetic circuits according to accelerations; and containing, for each magnetic circuit, a coil mounted on the rigid member thereof, the inductance of each coil varying with acceleration-induced variations in the reluctance of its magnetic circuit to produce different outputs for different accelerations.

12. In an accelerometer, the combination of a pair of magnetic circuits including a rigid member of magnetic material for each circuit and a spring member of magnetic material common to and forming an integral part of the two circuits, said spring member being located between the two rigid members and engaging them at corresponding parts of the two circuits and being separated from the members at other corresponding parts of the circuits to form air gaps one on each side of the spring member, the spring member flexing in response to accelerations to simultaneously increase one air gap and decrease the other air gap, thereby varying the reluctance of the magnetic circuits according to accelerations; a coil for each magnetic circuit, the inductance of each coil varying with the acceleration-induced variations in the reluctance of its magnetic circuit; means cooperating with the coils to form an alternating-current bridge in which the coils form two of four arms, variations in inductance of the coils due to accelerations changing their inductive reactance and changing the output from the bridge; means for supplying alternating current of the desired frequency to the bridge; and means controlled by the bridge to manifest changes in the output thereof whereby the magnitude of the accelerations can be made apparent.

13. A pick-up element for an accelerometer, containing a pair of magnetic circuits including a rigid member of magnetic material for each circuit and an inertia member of springy magnetic material common to and forming an integral part of the two circuits, said inertia member being located between the two rigid members and engaging them at corresponding parts of the two circuits and being separated from the members at other corresponding parts of the circuits to form air gaps one on each side of the inertia member, the inertia member flexing in response to accelerations to simultaneously increase one air gap and decrease the other air gap, thereby varying the reluctance of the magnetic circuits according to accelerations; and containing, for each magnetic circuit, a pair of coils mounted on the rigid member of each magnetic circuit and whose inductance varies with acceleration-induced variations in the reluctance of its magnetic circuit to produce different outputs for different accelerations.

14. In an accelerometer, the combination of a pair of magnetic circuits including a rigid member of magnetic material for each circuit and a spring member of magnetic material common to and forming an integral part of the two circuits, said spring member being located between the two rigid members and engaging them at corresponding parts of the two circuits and being separated from the members at other corresponding parts of the circuits to form air gaps one on each side of the spring member, the spring member flexing in response to accelerations to simultaneously increase one air gap and decrease the other air gap, thereby varying the reluctance of the magnetic circuits according to accelerations; a pair of coils for each magnetic circuit, the inductance of each of the coils of a pair varying with acceleration-induced variations in the reluctance of its magnetic circuit; means connecting the four coils to form an alternating-current bridge with each coil of the pair between different input and output means, variations in inductance of the coils due to accelerations changing their inductive reactance and changing the output of the bridge; input means for supplying alternating current to the bridge; output means for the bridge; and means connected to the output means to be controlled by the bridge to manifest changes in the output thereof whereby the magnitude of the acceleration can be manifested.

15. A pick-up element for an accelerometer, containing a pair of magnetic circuits including a rigid member of magnetic material for each circuit and an inertia member of springy magnetic material common to and forming an integral part of the two circuits, said inertia member being located between the two rigid members and engaging them at corresponding parts of the two circuits and being separated from the members at other corresponding parts of the circuits to form air gaps one on each side of the inertia member, the inertia member flexing in response to accelerations to simultaneously increase one air gap and decrease the other air gap, thereby varying the reluctance of the magnetic circuits according to accelerations; and containing, for each magnetic circuit, a transformer whose primary and secondary coils are mounted on the rigid member of the magnetic circuit and are coupled by the related magnetic circuit so that the voltage induced in the secondary coils will vary with variations in the reluctance of the related magnetic circuits to produce different potential outputs for different accelerations, variations in the number of turns and size of wire used in the primary and secondary coils enabling the output voltage range to be selected and enabling the reflected impedance of the transformers to be matched with that of external circuits to be used therewith.

16. In a capsule-like pick-up element for an accelerometer, the combination of a pair of round disc-like elements of magnetic material, each element having an annular recess therein forming a peripheral side wall and a central pole piece, said pole pieces also having oppositely-disposed recesses therein; an acceleration-responsive system within the capsule and including a disc-like spring member of magnetic material and an inertia member secured to the spring member; means securing the spring member between the elements at their peripheral side walls, said spring member being spaced from the pole pieces to form a similar air gap on each side of the spring member; said spring member forming an integral part of a magnetic circuit with each disc-like element, each circuit including one of said air gaps, and said inertia member of the acceleration-responsive system being secured to the spring member at the central free portion thereof and extending into the recesses in the pole pieces, so that when the capsule is moved in response to an acceleration the inertia member will lag behind the movement of the disc-like elements, flexing the spring member to vary the air gaps and thereby the reluctance of the magnetic circuits.

17. In a capsule-like pick-up element for an accelerometer, the combination of a pair of round disc-like elements of magnetic material, each element having an annular recess therein forming a peripheral side wall and a central pole piece; an acceleration-responsive system within the capsule and including a disc-like spring member of magnetic material; means securing the spring member between the elements at their peripheral side walls, said spring member being spaced from the pole pieces to form a similar air gap on each side of the spring member and said spring member forming an integral part of a magnetic circuit with each disc-like element, each circuit including one of said air gaps, and said acceleration-responsive system being effective, when the capsule is moved in response to an acceleration, to flex the spring member to vary the air gaps and thereby the reluctance of the magnetic circuits; and electrical means controlled by the magnetic circuits to vary the operating characteristics of the electrical means according to variations in the reluctance of the magnetic circuits.

18. In an accelerometer, the combination of a pair of round disc-like elements of magnetic material, each element having an annular recess therein forming a peripheral side wall and a central pole piece; an acceleration-responsive system within the capsule and including a weighted disc-like spring member of magnetic material; means securing the spring member between the elements at their peripheral side walls, said spring member being spaced from the pole pieces to form a similar air gap on each side of the spring member and said spring member forming an integral part of a magnetic circuit with each disc-like element, each circuit including one of said air gaps, and said acceleration-responsive system being effective, when the capsule is moved in response to an acceleration, to flex the spring member to vary the air gaps and thereby the reluctance of the magnetic circuits; electrical means controlled by the magnetic circuits to vary the operating characteristics of the electrical means according to variations in the reluctance of the magnetic circuits; means to supply operating potential to the electrical means; and means controlled by the electrical means to manifest the magnitude of the acceleration.

19. In a capsule-like pick-up element for an accelerometer, the combination of a pair of round disc-like elements of magnetic material, each element having an annular recess therein forming a peripheral side wall and a central pole piece, said pole pieces also having oppositely-disposed recesses therein; an acceleration-responsive system within the capsule and including a disc-like spring member of magnetic material and an inertia member secured to the spring member; means securing the upper member between the elements at their peripheral side walls, said spring member being spaced from the pole pieces to form a similar air gap on each side of the spring member and said spring member forming an integral part of a magnetic circuit with each disc-like element, each circuit including one of said air gaps, and said inertia member of the acceleration-responsive system being secured to the spring member at its central free portion and extending into the recesses in the pole pieces, so that when the capsule is moved in response to an acceleration the inertia member will lag behind the movement